(12) United States Patent
Quinet et al.

(10) Patent No.: US 7,721,294 B2
(45) Date of Patent: May 18, 2010

(54) OBJECT TRANSFER CONTROL IN A COMMUNICATIONS NETWORK

(75) Inventors: Raphaël Quinet, Liège (BE); Daniel Schaffrath, Viersen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 241 days.

(21) Appl. No.: 10/509,979

(22) PCT Filed: Apr. 5, 2002

(86) PCT No.: PCT/EP02/03802

§ 371 (c)(1),
(2), (4) Date: Mar. 18, 2005

(87) PCT Pub. No.: WO03/085924

PCT Pub. Date: Oct. 16, 2003

(65) Prior Publication Data

US 2005/0240940 A1    Oct. 27, 2005

(51) Int. Cl.
*G06F 9/54* (2006.01)
*G06F 15/16* (2006.01)

(52) U.S. Cl. .................................. 719/315; 709/217
(58) Field of Classification Search ................... 719/315
See application file for complete search history.

(56) References Cited

U.S. PATENT DOCUMENTS

| 5,675,721 | A | * | 10/1997 | Freedman et al. ........... 345/502 |
| 5,778,372 | A | * | 7/1998 | Cordell et al. ............... 707/100 |
| 5,987,466 | A | * | 11/1999 | Greer et al. .................... 707/10 |
| 6,144,996 | A | | 11/2000 | Starnes et al. |
| 6,154,769 | A | * | 11/2000 | Cherkasova et al. ......... 709/207 |
| 6,266,742 | B1 | | 7/2001 | Challenger et al. |

(Continued)

FOREIGN PATENT DOCUMENTS

EP        0 992 922 A        4/2000

(Continued)

OTHER PUBLICATIONS

Keshav, Srinivasan "An engineering approach to computer networking: ATM networks, the internet, and the telephone network", Addison-Wesley, 1997.*

(Continued)

*Primary Examiner*—Hyung S Sough
*Assistant Examiner*—Abdou K Seye

(57) ABSTRACT

A method and an intermediate component for controlling in a communications network an object transfer from a first network component via the intermediate component to a second network component which is remote from the first network component are described. The object transfer is based on a plurality of object requests relating to objects referred to in one or more codes to be processed by the second network component or another network component. The intermediate component forms the steps of sending an object request to the first network component, receiving the requested object from the first network component, updating and/or assessing a priority of the requested object, and, in dependence of the priority of the requested object, delaying the requested object or forwarding the requested object to the second network component. An initial priority is assigned to the requested objects on the basis of an analysis of at least one of the object request and the code that refers to the requested object.

21 Claims, 7 Drawing Sheets

U.S. PATENT DOCUMENTS

| | | | |
|---|---|---|---|
| 6,343,085 B1 * | 1/2002 | Krishnan et al. | 370/468 |
| 6,421,733 B1 * | 7/2002 | Tso et al. | 709/246 |
| 6,563,517 B1 * | 5/2003 | Bhagwat et al. | 715/735 |
| 6,658,485 B1 * | 12/2003 | Baber et al. | 719/314 |
| 6,763,371 B1 * | 7/2004 | Jandel | 709/204 |
| 6,954,429 B2 * | 10/2005 | Horton et al. | 370/230.1 |
| 7,340,499 B1 * | 3/2008 | Casella | 709/201 |
| 2001/0037389 A1 | 11/2001 | Fujimori et al. | |
| 2002/0042848 A1 * | 4/2002 | Takats | 709/316 |
| 2002/0178232 A1 * | 11/2002 | Ferguson | 709/217 |
| 2003/0200307 A1 * | 10/2003 | Raju et al. | 709/224 |

FOREIGN PATENT DOCUMENTS

| | | |
|---|---|---|
| EP | 1 011 244 A2 | 6/2000 |
| WO | WO 98 43177 A | 10/1998 |
| WO | WO 01/42941 A | 6/2001 |
| WO | WO 01 90912 A | 11/2001 |

OTHER PUBLICATIONS

European Patent Office, International Search Report for PCT/EP02/03802, dated Nov. 5, 2002.

Fielding, et al., "Hypertext Transfer Protocol—HTTP/1.1", Network Working Group, Jun. 1999.

Gilbert, Jeff, "Prioritization and Retransmission Within MEMUX", Feb. 18, 1999.

Gilbert, et al., Globally Progressive Interactive Web Delivery.

Masahiro Hori etal. "Annotation of Web Content for Transcoding", Jul. 10, 1999.

* cited by examiner

OBJECT TRANSFER CONTROL IN A COMMUNICATIONS NETWORK

BACKGROUND OF THE INVENTION

1. Technical Field

The invention generally relates to the field of communications networks and more particularly to an object transfer from a first network component via an intermediate component to a second network component, the second network component being remote from the first network component.

2. Description of the Prior Art

The transfer of information over modern communications networks like the public Internet or internal networks is based on specific transfer protocols. The World Wide Web for example, which constitutes a major aspect of the Internet, uses the Hyper Text Transfer Protocol (HTTP) for exchanging files comprising text, images, sound, video, and other contents.

Any WWW server contains, in addition to the files it can serve, an HTTP component that is designed to wait for HTTP requests and to handle them when they arrive. A WWW browser can be considered as an HTTP client that is configured to send HTTP requests to WWW servers. Whenever a user of the browser enters a file request by either "opening" a WWW file (by typing in a Uniform Resource Locator (URL)) or by clicking on a hyper text link, the browser builds a corresponding HTTP request for the file and sends it to the destination address. The HTTP component in the destination server receives the HTTP request and returns the requested file.

The requested file may be constituted by a Hyper Text Mark up Language (HTML) page that includes HTML code. When the browser receives the HTML page from the server and detects that the HTML code, which can be considered as an object itself, includes further objects such as (background) images, sounds, scripts or HTML frames, the browser issues further HTTP requests to the server in order to fetch the further objects which are included in the HTML code. Upon receipt of the further HTTP requests, the server sends HTTP responses including the requested objects like images to the browser. As becomes apparent from FIG. 1, the HTTP responses are sent from the server to the browser running on the client in the same order as the browser has issued the HTTP requests.

The order in which any additional objects included in the HTML code of the HTML page are requested by the browser usually depends on how the HTML page was written. For example an object that is included at the beginning of the HTML code is not necessarily displayed at the top of the HTML page because features such as tables, layers and frames allow the HTML author to use complex layouts. In addition, the order in which a browser issues HTTP requests depends also on internal browser algorithms. For example some browsers use complex heuristics for generating the HTTP requests by starting with requesting the first four objects as they appear in the HTML code of the page. After the first four objects have been requested, every second object starting from the top of the area that is currently visible to the user is requested, then every fourth object and so on. Other browsers use a simpler algorithm that requests the objects one by one as they appear in the HTML code. From the above it becomes apparent that it is usually difficult to predict the order in which HTTP requests for objects referred to in an HTML code are generated.

Moreover, it is difficult to predict the order in which requested objects are received by the browser. Although the current HTTP standard (HTTP/1.1) requires that on each Transfer Control Protocol (TCP) connection the HTTP responses are sent from the server to the browser in the same order as the HTTP requests are received by the server, the order in which HTTP responses are received becomes unpredictable as soon as more than one connection is opened to the server. The reason therefore is the fact that due to varying network conditions and different request processing times, some connections may transfer HTTP responses faster than others.

There is a need for a method and a device that enable an improved transfer of objects from a first network component to a second network component which is remote from the first network component.

SUMMARY OF THE INVENTION

According to one aspect of the invention this need is satisfied by a method of controlling in a communications network an object transfer from a first component via an intermediate (hardware or software) component to a second component which is remote from the first component, wherein the object transfer is based on a plurality of object requests relating to objects referred to in one or more codes to be processed by the second or another component of the communications network and wherein the intermediate component performs the steps of sending an object request to the first component, receiving the requested object from the first component, at least one of assessing and updating a priority of the requested object, wherein an initial priority has been assigned to the requested object on the basis of an analysis of at least one of the object request and the code that refers to the requested object, and, in dependence of the priority of the requested object, delaying the requested object or forwarding the requested object to the second component. An object may itself comprise code portions referring to one or more further objects. Furthermore, a code may itself form a (e.g. previously requested) object.

By intentionally delaying the object transfer based on an assigned priority, the overall transfer of objects is improved from a user's point of view (even if the total amount of data to be transferred is not decreased) because important objects are transferred preferentially. Furthermore, by implementing appropriate priority assignment schemes the object transfer from the first network component to the second network component becomes more predictable. For example objects being of higher significance to the user may be assigned a higher priority and may thus be preferentially transferred to the second component. On the other hand, objects being of lesser significance may be delayed. In the extreme case an object having a low significance may be delayed to such an extent that it is not transferred to the second component at all. This allows to control the order in which objects are received by the second component.

The assignment of absolute or relative priorities to objects (or classes of objects) may be performed dynamically. Once a priority has initially been assigned, this priority may be assessed with respect to specific absolute values like thresholds or with respect to priorities of other objects. Based on the assessment it can be decided whether or not an object is to be delayed. Prior to the assessment a priority initially assigned to an object may be evaluated anew with the purpose of determining whether the initial priority has to be updated.

The intermediate component may be operated to re-order objects received from the first component. The delaying of objects is thus preferably performed such that the order in which the intermediate component receives the objects from the first component differs from the order in which the objects are forwarded to the second component. The reordering may be based on the priorities of the objects to be transferred. During the reordering there might arise the situation that due to the delay of some objects the transfer of other objects is actually accelerated.

The object request that is sent to the first component may be generated by the intermediate component. When the requested object is received by the intermediate component, it "pushes" it to the second component without having received an explicit object request from the second component. Alternatively, the object request may be generated by the second component and sent to the intermediate component. Upon receipt of the object request from the second component, it may be processed by the intermediate component and forwarded to the first component.

When the intermediate component receives the requested object from the first component, the received object may either be delayed or directly forwarded to the second component. There exist various possibilities how the requested object that is received by the intermediate component can be delayed. Delaying of the requested object can for example include at least one of instructing the second component to repeat the object request, suspending a connection to the second network component via which the requested object is to be forwarded, and informing the second component that the requested object will automatically (e.g. without any further object request from the second component) be forwarded to the second component at a later point in time.

If delaying of the requested object includes instructing the second component to repeat the object request, the intermediate component may perform the steps of assigning a specific attribute to the object to be delayed, informing the second component of the attribute, receiving a reference to the attribute (e.g. the attribute itself or an unambiguous reference derived from the attribute) from the second component, and, upon receipt of the reference to the attribute, sending the delayed object to the second component or further delaying the delayed object. The decision whether a delayed object is to be sent to the second component or delayed further may be based on the newly assessed relative priority of the repeatedly requested object.

The attribute can be considered as a common denominator which enables the intermediate component and the second component to negotiate about the transfer of the object to which the attribute has been assigned. Usually, the form of the attribute will depend on the characteristics of the transfer protocol that is used for the object transfer. In the case of HTTP for example, the attribute may be constituted by a virtual URL created by the intermediate component. It should be noted that the attribute-based delay scheme of instructing the second component to repeat the object request can generally be used to delay objects and does not necessarily require that priorities have been assigned to the objects to be transferred.

In the attribute-based delay scheme the object may be send from the intermediate component to the second component in response to an object request received from the second component or in accordance with a pushing scheme, i.e. independently of such an object request from the second component. If the delay scheme is based on an object request received from the second component, the second component may be informed about the attribute in context with an instruction to repeat the object request. In such a case the reference to the attribute may be received by the intermediate component in context with a repeated object request from the second component.

The objects to be transferred to the second component may be forwarded to the second component via a single or via a plurality of connections between the intermediate component and the second component. In such a multiple connections scenario selected ones of the connections to the second component may be suspended dependent upon the (initial or updated) priorities of the requested objects that are to be forwarded via the selected ones of the connections to the second component. The intermediate component may thus suspend one or more connections so that objects having a high priority can make use of the additional bandwidth that is released on the link between the intermediate component and the second component. In order not to waste available bandwidth the intermediate component is preferably configured such that it ensures that a link formed by two or more connections is fully used before suspending one or more connections thereof.

There exist various techniques for suspending a connection. For example transmission over the connection could be blocked for a specific period of time while leaving the connection as such open (intermediate state=open). Alternatively, the connection could be closed (intermediate state=closed) while saving the state of the connection. In such a case the connection may be reopened at a later point in time in the same state in which it was closed. According to a third possibility, the connection may be completely closed without saving any information about the state of the connection. In any case the second component can be informed that the one or more objects to be transmitted via the closed connection will be sent later, either in response to or independently from a (repeated) object request.

Instead of or in addition to suspending individual connections, the object transfer may also be delayed by a priority based adjustment of the transfer speed. To that end, a specific share of processing capabilities may be dynamically allocated to each object or each connection. In the case of multiple connections, all connections or at least some connections get a share of the CPU time, i.e. a share of the network bandwidth. The share of processing capabilities allocated to a specific connection may be changed (e.g. decreased constantly) while one or more objects are transferred via the respective connection.

It has been mentioned above that the object transfer is based on a plurality of object requests relating to objects referred to in one or more codes. According to a first variant of the invention a code is readily available to at least one of the second and the intermediate component. According to a second variant of the invention the code has yet to be loaded by either one of the second and the intermediate component. In the latter case the intermediate component may send a code request that has been generated by the second component or by the intermediate component to the first component or a third component that is different from the first component. When the requested code is received from the first or the third component, it may be analyzed by the intermediate component with respect to references to objects comprised within the code. Any references to objects contained in the code may then be assessed with the purpose of assigning (initial) priorities to the objects referred to in the received code. The code received from the first or the third component may eventually be forwarded by the intermediate component to the second component.

Upon receipt of a response from the first component the requested object contained in the response may be evaluated with respect to the received object's priority. For example at least one of the object size, the object content and a header of the response may be analyzed to that end. It can then be determined whether or not an initial priority of a received object has to be updated.

Preferably, at least some information about each object or each class of objects is stored for example by the intermediate component. The stored information may comprise priority information for individual objects or a classes of objects, preferably, in the form of a priority list. This priority list may be repeatedly assessed. Such an assessment can relate to at least one of updating priority information and deleting objects or classes of objects from the priority list.

The invention may be implemented as a hardware solution or as a software solution. In the case of a software solution the invention may be realized in the form of a computer program product comprising program code portions for performing the individual steps of the invention. The computer program product may be stored on a computer readable recording medium.

According to a preferred embodiment of the invention the intermediate component is implemented as a proxy component in the form of a piece of software running on the first or the second component of the communications network. If the invention is implemented as a hardware solution, the intermediate component may be constituted by a separate piece of hardware like a proxy server arranged between the first and the second component in the communications network. The intermediate component may include one or more appropriately configured communication interfaces for communicating with at least the first and the second component of the communications network as well as a unit for performing the processing in context with delaying of objects.

In the communications network there exists a first link between the intermediate component and the first component and a second link between the intermediate component and the second component. Preferably, the first link and the second link have different transfer rates. For example a fast link may be provided between the intermediate component and the first component and a comparatively slower link may be provided between the intermediate component and the second component. This situation is usually given when the first component is a network server, the second component is a network client and the intermediate component is located in the vicinity of (in terms of network links) or on the network server. However, the intermediate component could also be located close to (in terms of network links) or on the network client. In such a case the link between the intermediate component and the second component (the network client) has a much higher capacity and lower latency than the link between the intermediate component and the first component (the network server).

It should be noted that the invention is not restricted to the case that the first component acts as network server and the second component acts as network client. In particular, the intermediate component could also be used to improve the object transfer between two network clients or two network servers.

According to an especially preferred embodiment of the invention the intermediate component is part of a wireless communications network like a GSM, GPRS, etc. cellular network. In such a network the second component may be constituted by a mobile terminal.

BRIEF DESCRIPTION OF THE DRAWINGS

Further aspects and advantages of the invention will become apparent upon reading the following detailed description of preferred embodiments of the invention and upon reference to the drawings, in which.

DESCRIPTION OF A PREFERRED EMBODIMENT

Although the present invention can be practiced in any communications network in which a request-based object transfer via an intermediate component is performed, the following description of preferred embodiments is exemplarily set forth with respect to the transfer of HTML code in accordance with the HTTP protocol over the WWW. In principle, transfer protocols different from HTTP, like the wireless WAP transport protocol or some Remote Procedure Call (RPC) mechanisms, and codes different from HTML, for example the WAP Markup-Language (WML) or any derivatives of the extensible Markup-Language (XML), could be utilized as well. Furthermore, although the following description mainly concerns an object transfer from a server to a client, the object transfer could be performed between any two or more network components.

Figure 1:
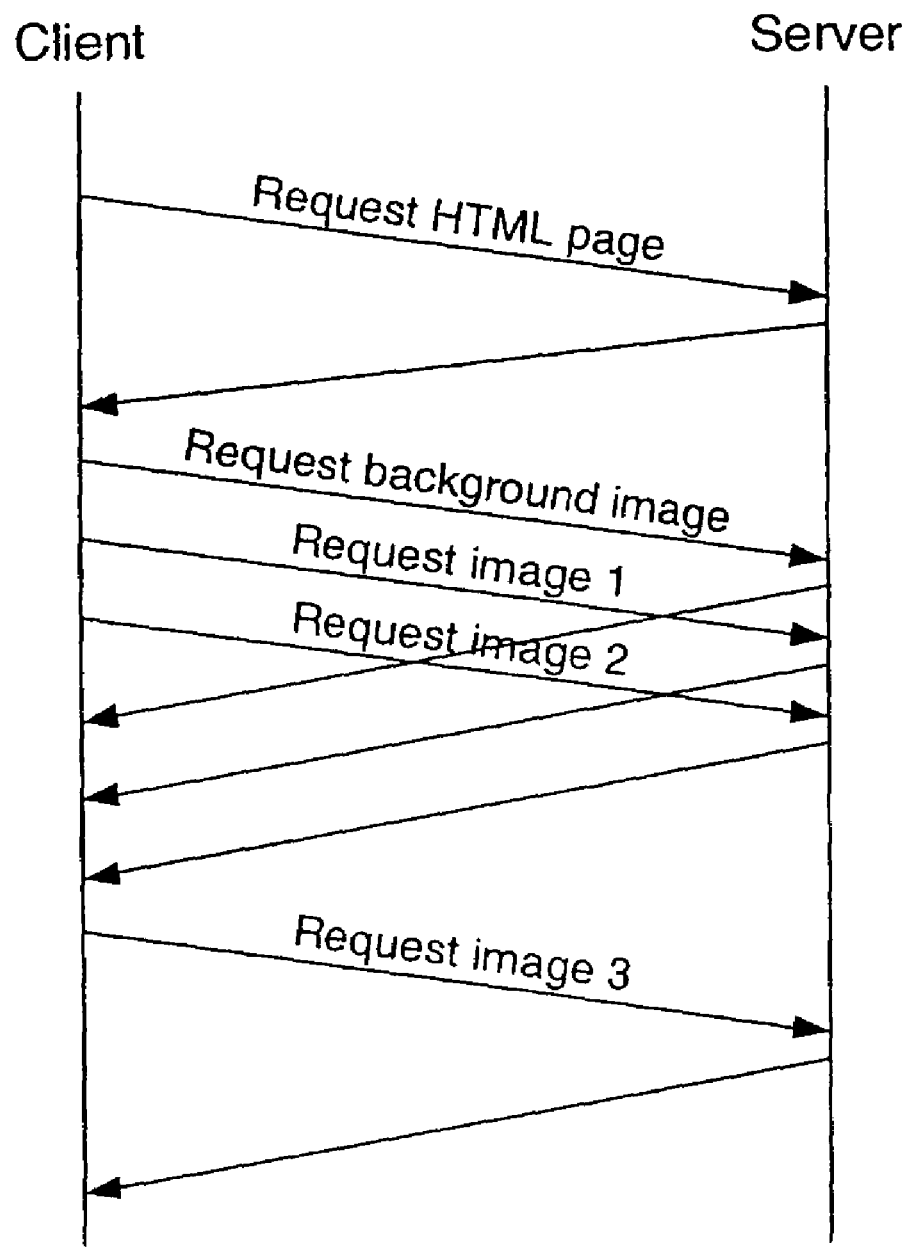
FIG. 1 is a schematic diagram illustrating a transfer of objects between a network server and a network client in accordance with HTTP.
Figure 2:
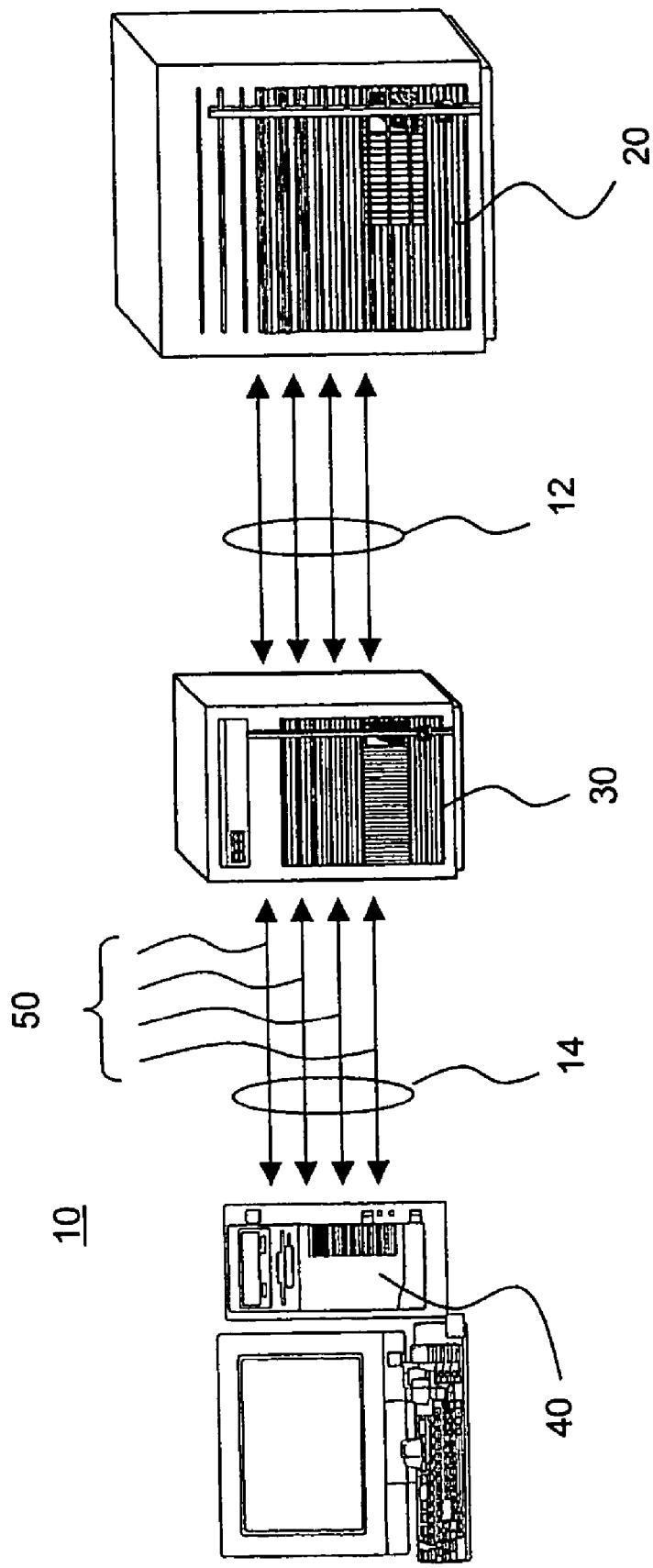
FIG. 2 is a block diagram of a network system comprising an intermediate component in the form of a HTTP proxy server according to the invention.

In FIG. 2, a block diagram of a network system 10 according to the invention is depicted. As becomes apparent from FIG. 2, the network system 10 comprises a first component in the form of a server 20, an intermediate component in the form of a HTTP proxy server 30 and a second component in the form of a client 40. The proxy server 30 is arranged in the network system 10 such that it has a fast link 12 towards the server 20 and a comparatively slower link 14 towards the client 40. Each link 12, 14 is constituted by a plurality of TCP connections 50. Each TCP connection 50 is configured to allow the transfer of HTTP requests and HTTP responses between the server 20 and the client 40.

The proxy server 30 performs some traditional proxy functions like caching and filtering of objects. Additionally, the proxy server 30 is configured to artificially delay an object that is received from the server 20 and that is to be forwarded to the client 40. This is done by using a combination of temporary suspension of data transfer on some connections 50 and HTTP redirection messages that force a browser running on the client 40 to repeat an object requested after a certain period of time. By using these mechanisms the proxy server 30 re-orders the HTTP responses received from the server 20 in such a way that objects having a higher priority are delivered to the client 40 first. For that purpose the proxy server 30 dynamically assigns priorities to the objects to be forwarded to the client 40. In order to ensure that delaying of the less important objects does not cause the link 14 between the proxy server 30 and the client 40 to become idle, the proxy server 30 continuously or at least repeatedly monitors the traffic on this link 14.

Figure 3:
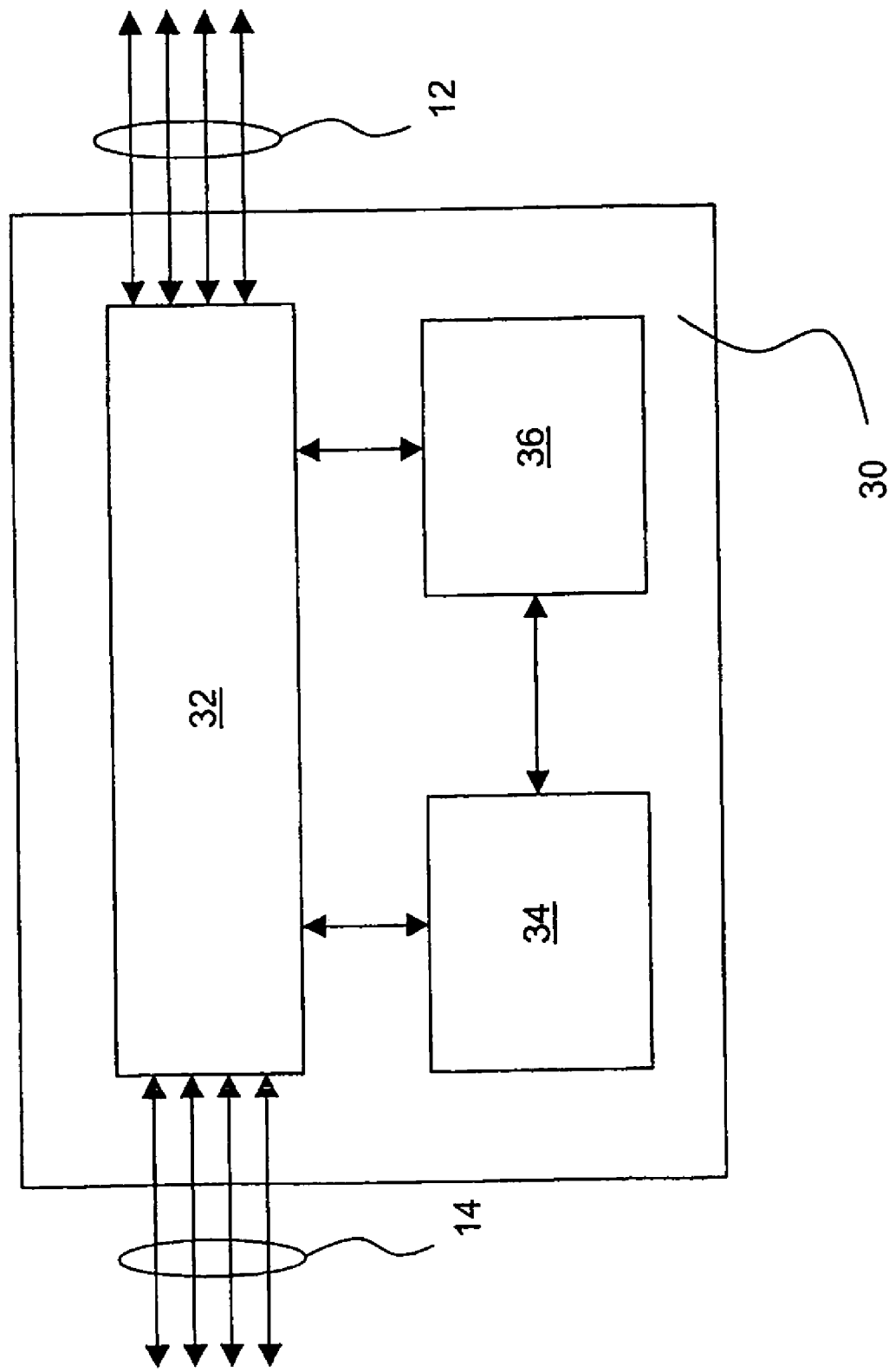
FIG. 3 is a block diagram of the HTTP proxy server of FIG. 2.

The construction of the proxy server 30 is depicted in more detail in FIG. 3. As becomes apparent from FIG. 3, the proxy server 30 comprises a communications interface 32 coupled between the first link 12 to the server 20 and the second link 14 to the client 40. The communications interface 32 is configured such that it enables the sending of object requests to and the receipt of the requested objects from the server 20. A processing unit 34 of the proxy server 30 communicates with the communications interface 32. The processing unit 34 allows to assess and/or adapt the priority of any object received via the first link 12 from the server 20. Additionally, the processing unit 34 allows to assign an initial priority to a requested object on the basis of an analysis of at least one of the object request and the code that refers to the requested object. Possible assignment schemes will be discussed later in more detail.

In dependence of the initial or updated priority of an requested object the processing unit 34 controls the communications interface 32 such that a requested object received from the server 20 is either delayed or forwarded via the second link 14 to the client 40. If a requested object received from the server 20 is to be delayed, it is temporarily stored in a buffer 36 that can be accessed by both the communications interface 32 and the processing unit 34. Alternatively or in addition, the buffer 36 may be implemented as a software or hardware component of the processing unit 34.

Besides the tasks outlined above, the processing unit 34 is additionally configured such that it allows to assign a specific attribute to an object which is to be delayed (an exemplary format of this attribute will be discussed later in more detail). The processing unit 34 enables to control the communications interface 32 such that the communications interface 32 informs the client 40 about this attribute. If the communications interface 32 receives a reference to the attribute from the client 40, the processing unit 34 evaluates this reference and controls the communications interface 32 such that the delayed object to which this attribute has previously been assigned and which is currently stored in the buffer 36 is either sent to the client 40 or further delayed. A further delay of the object stored in the buffer 36 may become necessary if objects of a higher priority have to be forwarded to the client 40 first.

In the following, a preferred operational mode of the network system 10 shown in FIG. 2 will exemplarily be described.

When a user enters a URL, clicks on a link or follows a bookmark, the browser running on the client 40 issues a HTTP request for the corresponding HTML page including HTML code. The HTTP request issued by the browser is received by the proxy server 30 via the link 14 and forwarded via the link 12 to the destination server 20. The server 20 replies by sending the HTML code for the requested page to the proxy server 30, which analyzes the HTML code received from the server 20 to assign an initial priority to any kind of objects like links, frames, scripts, images, etc. referred to in the HTML code (first analysis phase).

Independently from this analysis of the HTML code, the proxy server 30 forwards the HTML code via the link 14 to the client 40. When the browser running on the client 40 receives the HTML page including the HTML code it processes the HTML code. If the browser detects that the HTML code includes further objects, it issues further HTTP requests for the objects referred to in the HTML code. These HTTP requests for further objects are received and evaluated by the proxy server 30. To most of the requested objects an initial priority will have been assigned already during the proxy server's 30 previous analysis of the HTML code that it has forwarded to the server 40. However, in this second analysis phase the proxy server 30 either assigns initial priorities to those objects to which a priority has not yet been assigned or updates the priority of such objects to which an initial priority has already been assigned. The priority is updated on the basis of additional information available in the HTTP request received from the client 40.

The proxy server 30 forwards any HTTP requests for additional objects received from the client 40 to the server 20. The server 20 replies by sending the requested objects to the proxy server 30. The proxy server 30 analyzes the HTTP responses (including the requested objects) from the server 20 in a third analysis phase and updates—if necessary the priorities of the objects comprised in the HTTP response. Additionally, the proxy server 30 assesses the relative priority of any received object with respect to the priority of previously received objects that are still stored in the buffer 36 (see FIG. 3) and the priorities of objects that are expected soon. Information regarding the objects that will be received soon from the server 20 can be derived from the HTML code that has previously been forwarded to the client 40 or from HTTP requests from the client 40 for which the corresponding objects have not yet been received from the server 20. Alternatively or additionally, the proxy server 30 may be configured such that it compares a priority of an object that has just been received from the server 40 with an absolute value like a priority threshold.

Based on the evaluation of an object's absolute and/or relative priority and the current and/or predicted traffic on the link 14, the proxy server 30 decides if this object is to be delayed, e.g. if this object is to be temporarily stored in the buffer 36 or if the corresponding HTTP request is not yet to be forwarded to the server 20, or if the object is to be immediately forwarded to the client 40.

The intentional delay of individual objects improves the overall object transfer from a user's point of view. It is for example well known that the relative importance of the various objects included in a web page varies greatly: An image that is used to build a graphical menu may be essential for the navigation of a site, while a background image merely makes the page look nicer. The invention can thus be employed to provide the user with the more important information first. As soon as there is enough information of a web page displayed on the user's screen, the user can decide to click on a link and request another web page without having to wait for the remaining (less important) parts of the previous web page that is still being transferred. As a result, the user is no longer forced to wait until some uninteresting objects are transferred before being able to see the important ones. This is especially useful in conjunction with the mobile Internet, which is usually slower and more expensive than the fixed Internet.

Assignment and Adjustment of Priorities

As has become apparent from the above, the proxy server 30 can assign or adjust the priority of an object to be sent to the client 20 during three different phases, namely when a reference to that object is found in an HTML code (i.e. in a previous object) that is to be forwarded to the client 40, when a HTTP request relating to that object is issued by the browser running on the client 40, or when the corresponding HTTP response containing the requested object is received from the server 20.

In the following, various schemes for assigning or updating priorities during each of these three phases are exemplarily described. During any of the three phases a priority list that contains priority information for individual objects or classes of objects is either generated or updated. In the priority list, the individual objects or classes of objects are ordered with respect to increasing or decreasing priority. The order of the objects in the priority list can thus be considered as priority information. However, additional priority information like absolute or relative priority values (numbers) may alternatively or additionally be part of the priority list.

The exact priority assigned to specific objects or classes of objects is implementation-dependent and in the exemplary embodiment configurable by the operator of the proxy server 30 or a user of the browser running on the client 40. For example in order to allow the operator of the proxy server 20 to have more control over the priority of some objects, there could be one or several lists of URLs (using pattern matching) that allow the operator to increase or decrease the priority of the objects appearing on those lists. For example an operator could decide to increase or decrease priority of all images downloaded from an advertising company. The same possibilities may be made available to the user. For example the user could send his preferences to the proxy server 30. This can be done by a specific software running on the client 40 or by using designated web pages provided directly by the proxy server 30 and allowing the user to set his preferences.

In the first analyzing phase the proxy server 30 can assign an initial priority to an object by analyzing an HTML code that has been requested by the client 40 from the server 20. In particular, references to objects referred to in the HTML code may be assessed to that end. In this way a priority list may be generated that lists individual objects which are referred to in the HTML code in the following order (objects of highest priority are mentioned first):

links to other pages
    frames
    inlined images (if the IMG tag includes width and height information, this information can be used to refine the priority of images depending on the expected dimensions so that smaller images get a higher priority than larger ones)
    style sheets
    scripts (JavaScript, VBScript, etc.), embedded objects and applets
    background image (page background, table background, style sheet, etc.)
    any object that was already sent to the client 40 gets the lowest priority In addition the priority of a specific object can be lowered if the object is not located on the same server 20 or on the same domain as the current HTML page.

A further possibility to assign or adjust the priority of an object occurs when a request for that object is issued by the browser and received by the proxy server 30. In such a case the HTTP request can be analyzed by the proxy server 30 in an URL context (second analysis phase). Since initial priorities have already been assigned during analysis of the HTML code that led to that HTTP request, analysis of the HTTP request will usually result in an adjustment of the initial priority. However, in some cases initial priorities may be assigned also (see above).

The adjustment or assignment of initial priorities in the second analysis phase can be performed in dependence on additional information available for example in the header of the HTTP request. One or more of the following rules for updating the priorities may be implemented:

The analysis leads to the result that the browser has already requested the same object once. Such an object is preferably assigned a very high priority in order to avoid infinite loops caused by browsers that are not fully compliant to HTTP/1.1 and ignore the Retry-After header (this header will be discussed below in more detail).

The object does not have a priority yet, but the file extension looks like HTML (".HTML",".HTM") or XML (".XML") or looks like a directory index (ends"/"). Such a priority assignment ensures that a HTML page requested from the bookmarks or typed in directly will be requested with a high priority.

The browser makes a conditional HTTP request for an object, using if-modified-since or similar conditions. This indicates that the browser has probably cached a copy of the object. The reply is expected to be small if the cached copy is still valid (HTTP reply code "304 not modified").

The URL of the requested object was found while parsing a previous HTML page.

Any object that was not inserted in the list while parsing the HTML tags of a previous page was probably requested indirectly by a script and should get a lower priority than most of the other requested objects.

In the third analysis phase, the adjustment of object priorities is based on an analysis of the HTTP response from the server 20. The adjustment of the priorities in the third analysis phase (as well as in the second analysis phase mentioned above) can be calculated as a weighted sum of several criteria. The weights may be configurable by the operator of the proxy server 30 or the user of the browser running on the client 40.

In the third analysis phase, all objects will usually have a priority assigned to them. However, this priority can be updated before sending the requested objects to the client 40. To adjust the priorities, the headers and contents of the HTTP responses received from the server 20 may be assessed. The priorities may then be adjusted in accordance with one or more of the following rules:

Assessment of the reply code: the relative priority of the HTTP responses depends on the first digit of the reply code. Error codes (4xx, 5xx) should have a higher priority than normal replies (2xx).

Assessment of the content type: a HTML code should have a higher priority than any image.

Assessment of the objects size (derived from the content-length if specified in the headers, or from the total size if the object is already cached): smaller objects should have a slightly higher priority than larger ones.

Analysis of the content: for example animated images can be assigned a lower priority than static images. The analysis of the content can also form the basis for estimating the size of the object if this information is not available in the HTTP header and the object has not yet been cached.

If the reply code is a permanent or temporary redirection (3xx) specifying a new location for the requested object, then this new location gets the same priority as the original object.

In the three analysis phases described above the proxy server 30 sets and updates the priorities of the objects that are to be transferred to the client 40. The proxy server 30 thus keeps some information about each object like the object's URL, priority, time of last request and, if required, some further parameters. However, this information can not be kept forever since otherwise the proxy server 30 would run out of memory. Moreover, if an object to which a high priority has been assigned is never requested, action is preferably taken so that it does not prevent other objects from being transferred.

For these reasons a routine is implemented that ensures that information that is no longer up to date or that is no longer required is deleted. To that end one or more of the following mechanisms may be used:

- Any object that is successfully transferred to the client is marked as having been sent or is moved to a separate list of objects that have been sent to the client 40.
- A maximum size for one or more lists containing relevant information is set and configured such that older objects or objects with the lowest priority expire first.
- Whenever the client resets a TCP connection before the object is fully transferred (meaning that the user has stopped the download and may have selected another page), clear the information of objects to be sent.
- As an alternative to the previous solution, keep cross-references for each object in order to associate each HTML page with the objects that it contains and vice versa. When the client 40 resets a TCP connection, remove only the objects that are included in the same HTML page.
- The priority of all objects can be decreased after a specified amount of time or after some number of HTTP requests or HTTP responses have been processed.

Reordering of Objects

In the previous chapter the generation of a priority list for the requested objects to be transferred to the client 40 as well as possible updating mechanisms for this priority list have been described. Usually, the requested objects will be received by the proxy server 30 from the server 20 in an order that is different from the order indicated in the priority list. Consequently, the proxy server 30 has to reorder the objects received from the server 20 in such a manner that they are forwarded from the proxy server 30 to the client 40 in an order which reflects the order in the priority list as closely as possible. The proxy server 30 reorders the objects received from the server 20 by intentionally delaying objects having a lower priority and by forwarding objects having a higher priority without any substantial delay to the client 40.

The proxy server 30 uses a combination of different delay mechanisms to reorder the objects received from the server 20. In the following, two of these delay mechanisms, namely suspension of TCP connections on the one hand and HTTP redirections on the other hand, will exemplarily be described in more detail Suspension of TCP Connections As becomes apparent from FIG. 2, the link 14 between the proxy server 30 and the client 40 is constituted by a plurality of TCP connections 50. Dependent upon the priorities of the requested objects that are to be forwarded via individual ones of the connections 50, one or more of the connections 50 that are intended for the transfer of objects having a low priority are suspended. This suspension of individual connections releases some bandwidth on the link 14 that is now available for preferentially transferring objects having a higher priority. Consequently, objects having a higher priority will be delivered before objects having a lower priority.

The suspension of an individual connection 50 is performed such that the connection 50 is left open without transferring objects for a certain period of time. Alternatively, suspension of a connection 50 could be effected by closing the connection 50, either with our without saving the state of the connection 50 prior to its suspension. When the state of the suspended connection 50 is saved, it can be opened at a later point in time in the same state as it has been suspended (i.e. closed).

Suspension of a connection 50 has the advantage that no extra data has to be sent via the link 14. Preferably, a connection 50 is suspended only if the released bandwidth can be fully used by some other connections 50 for the transfer of objects having a high priority.

The proxy server 30 is thus configured such that it checks that the link 14 is fully used before suspending a connection 50 in order not to waste available bandwidth. A possible routine for predicting if the link 14 is or will be partially idle includes comparing the average throughput (over the last N seconds) of all connections 50 going to the client 40 with the amount of data that is currently cached or buffered in the buffer 36 of the proxy server 30 (see FIG. 3) and is ready to be sent. Other and in particular simpler techniques for estimating the utilization of the link 14 could be implemented as well, especially if the available bandwidth on the link 14 is known by other means.

HTTP Redirections

If the proxy server 30 expects that objects having a high priority will soon have to be transferred to the client 14 (e.g. because links to these objects have previously been detected by the proxy server 30 while forwarding the HTML code of a HTML page to the client 40), and suspension of a connection 50 would waste some bandwidth because there is currently nothing else to transfer on the other connections 50, then the proxy server 30 may utilize another delay scheme. A possible delay scheme that is applicable in such a case includes instructing the client 40 to repeat an object request at a later point in time.

Although HTTP specifies that any HTTP responses must be sent to the client 40 in the same order as the browser running on the client 40 has issued the HTTP requests, it is possible to instruct the browser to retry a HTTP request later. This can be done by sending a HTTP response with the status code "302" to the client 40, together with the header field "Retry-After". This header field tells the client 40 to retry his HTTP request after a specified amount of time. In response to the receipt of the status code "302" (possibly including the "Retry-After" header field), current browsers re-schedule the HTTP request after all pending HTTP requests have been processed.

The status code "302" as specified in the HTTP standard 1.1 tells the browser that a given object can be found (temporarily) at a location that is different from the one that was requested. The HTTP response sent to the client 40 includes the new location of the object. This mechanism is used to implement the delay scheme according to the invention.

According to the invention the proxy server 30 generates an attribute in the form of a new (virtual) URL for the object to be delayed. The proxy server 30 then instructs the browser running on the client 40 to try the HTTP request again, using this temporary attribute (i.e. URL) as the new location of the object. The browser is thus instructed to re-schedule the HTTP request at a later point in time. When the browser repeats its HTTP request (including the temporary attribute, i.e. the virtual URL), the proxy server 30 converts the attribute to the original URL and forwards the HTTP request to the server 20. Alternatively, the original HTTP request could have been forwarded to the server 20 after receipt thereof by the proxy server 30. In such a case the HTTP response received from the server 20 is temporarily stored by the proxy server 30 until it receives the repeated HTTP request from the client 40.

In the following, the inventive delay mechanism discussed above will exemplarily be described in more detail with reference to FIGS. 4 and 5. It will be assumed that the HTTP request received by the proxy server 30 from the client 40 relates to an object that is considered by the proxy server 30 to be of a low priority.

Figure 4:
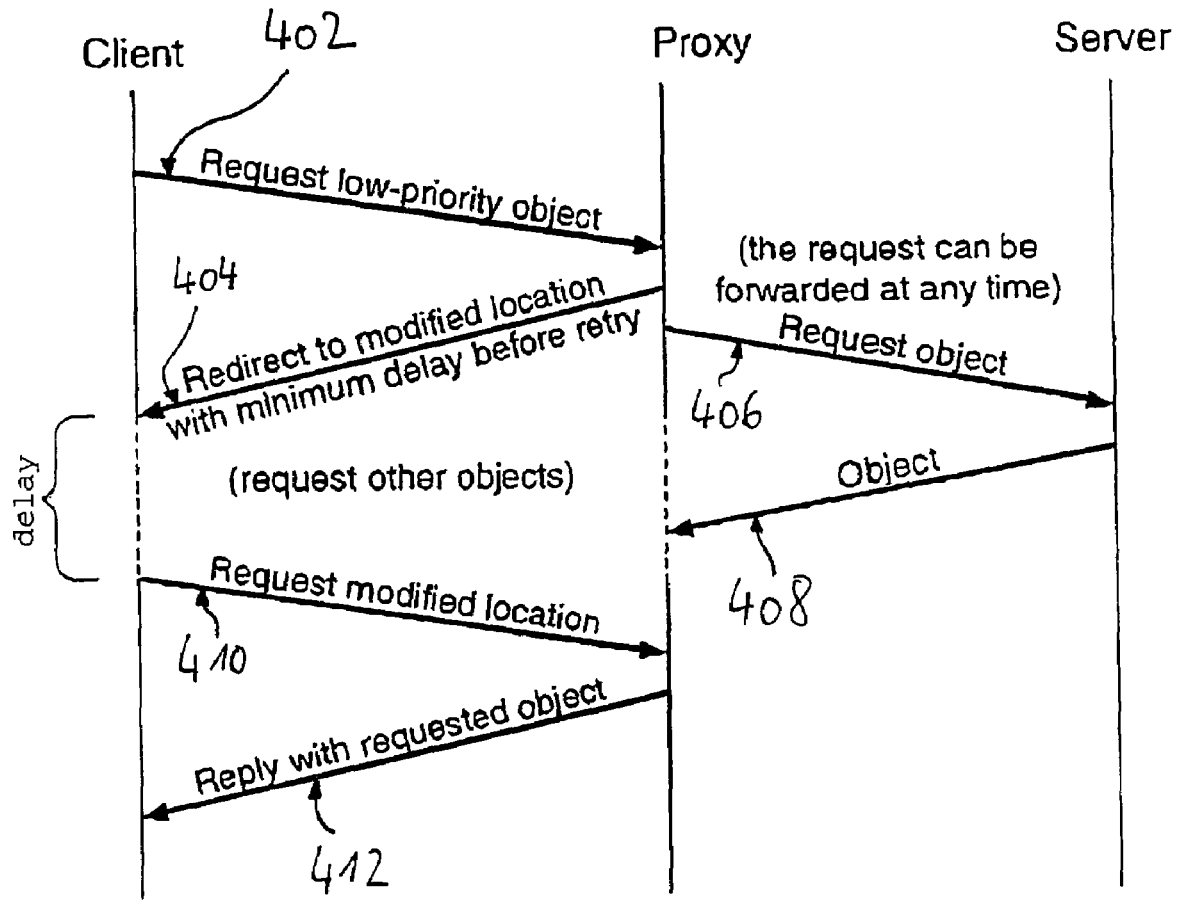
FIG. 4 is a schematic diagram depicting a redirection-based object delay in the network system depicted in FIG. 2.
Figure 5:
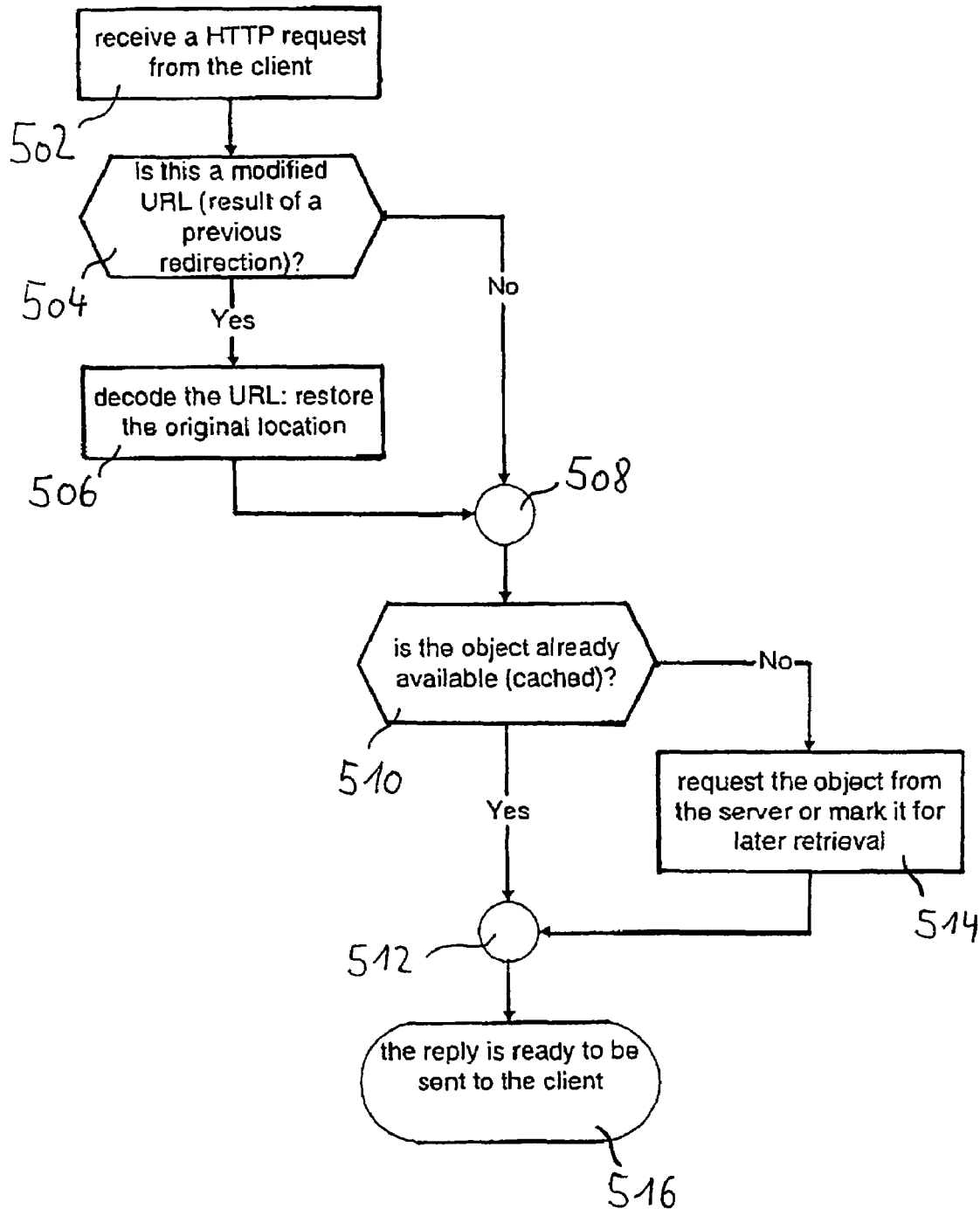
FIG. 5 is a flow chart reflecting the steps preceding an object delay.

In a first step 402 of FIG. 4, the proxy server 30 receives a HTTP request from the client 40 via the link 14. In the exemplary case of HTTP this first request from the client could have the following format:

GET http://example.com/some/image.png HTTP/1.1
Host: example.com
User-Agent: Mozilla/5.0 (X11; Linux i686; en-US; rv: 0.9.9)
Gecko/20020311
Connection: close In response to the HTTP request received in step 402 from the client 40, the proxy server 30 redirects the client 40 in step 404 to a new (virtual) location and instructs the client 40 to wait for a certain period of time (delay) before retrying the HTM request. The redirection message from the proxy server 30 on the basis of the status code "302" as specified in the HTTP standard 1.1 can have the following format:

HTTP/1.1 302 Found
Date: Thu, 21 Mar. 2002 15:12:47
Server: PrioTest/0.9
Location: http//example.com/some/( )image(0001).png
Retry-After: 5
Connection: close
Transfer-Encoding: chunked
Content-Type: text/html; charset=iso-8859-1
(some human-readable text follows)

The proxy server 30 can now request the object from the server 20 at any time after receipt of the initial HTTP request from the client 40 (step 402) and the time at which it decides to deliver the object to the client 40 (steps 406 and 408).

After receipt of the above redirection message the client 40 waits for a period of time specified in the redirection message, i.e. five seconds (or until all other objects have been transferred). In step 412 the client 40 then repeats his HTTP request indicating the new (virtual) location as follows:

GET http://example.com/some/( )image(00001).png HTTP/1.1
Host: example.com
User-Agent: Mozilla/5.0 (X11; Linux i686; en-US; rv:0.9.9)
Gecko/20020311
Connection: close Upon receipt of the repeated HTTP request from the client 40, the proxy server 30 decides whether to delay the requested object further (e.g. by suspending a connection 50 or by a further redirection message) or whether to forward the delayed object to the client 40. If the proxy server 30 decides to forward the delayed object without any further delay, this can be done in the following format:

HTTP/1.1 200 OK
Date: Thu, 21 Mar. 2002 15:12:50
Server: Apache/1.3.23 (Unix)
Content-Type: image/png
Content-Length: 1520
(the contents of the image follow)

Now, the decisions taken by the proxy server 30 in the course of the redirection routine discussed above with reference to FIG. 4 will be explained with reference to FIG. 5.

In step 502 the proxy server 30 receives the HTTP request from the client 40. In the following step 504 the proxy server 30 determines whether the URL included in the HTTP request is a modified URL, i.e. the result of a previous redirection. If this is the case, the proxy server 30 decodes the URL and restores the original location in step 506 and moves via node 508 to step 510. Otherwise the method directly moves from step 504 via node 508 to step 510.

In step 510 the proxy server 30 determines if the object requested by means of the HTTP request is already available, i.e. stored in the buffer 36 of the proxy server 30 (see FIG. 3). If the object is not already cached, the proxy server 30 requests the object from the server 20 or marks it for later retrieval in step 514. From step 514 the method moves via node 512 to step 516. Step 516 can also be reached directly from step 510 via node 512 in the case the object requested by the client 40 is already available.

In step 516 the HTTP response including the requested object is ready to be sent to the client 40. This corresponds to the first step in the flow chart of FIG. 6 which will be discussed below.

In principle, the redirection message (step 404 in FIG. 4) can be sent to the client 40 at any time while steps 502 to 516 are performed or after step 516. It should be noted that the availability of an object (i.e. whether a requested object is already cached, currently in transfer or whether the object is not requested yet) is a further factor that influences the initial priority of a requested object.

Re-Ordering Decisions

Figure 6:
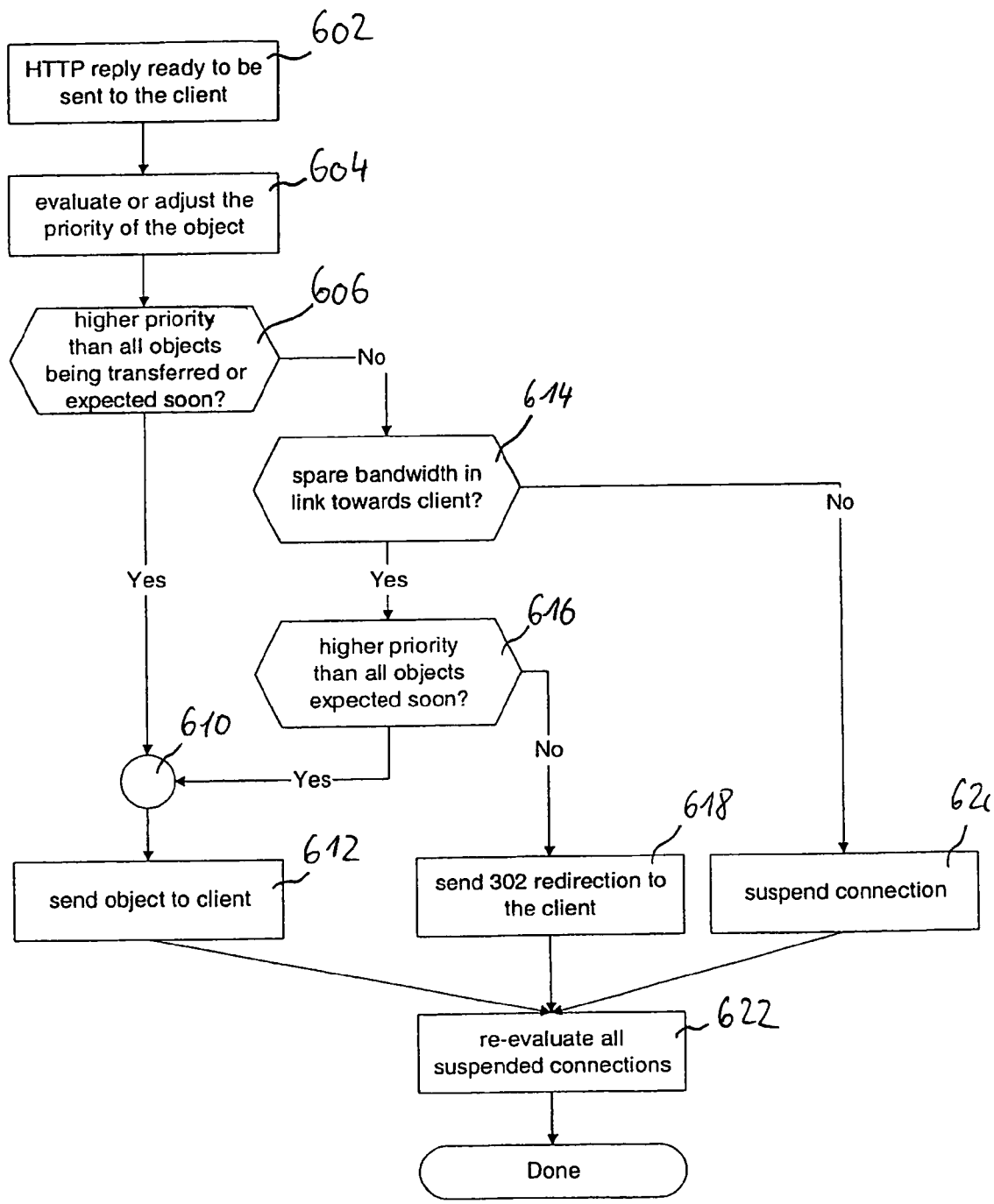
FIG. 6 is a flow chart depicting the decisions involved in an object transfer according to the invention.

Once the HTTP response is ready to be sent to the client 40 (step 516 in FIG. 5), it has to be decided if an object comprised in the HTTP response should actually be delivered to the client 40, if the client 40 should be redirected or if the connection 50 via which this object is to be sent to the client 40 should be suspended. A flow chart depicting an exemplary decision scheme in this regard is depicted in FIG. 6.

In step 602 the HTTP response is ready to be sent to the client. In the following step 604 the priority of this object is evaluated with respect to the fact whether or not the priority has to be updated. If the priority of the object has to be updated, the priority is adjusted in step 604.

In the next step 606 the current priority of the object is assessed to find out if it has the highest priority of all objects that are being transferred or that are expected soon. If it is determined In step 606 that the requested object actually has the highest priority, the method moves via node 610 to step 612. In step 612 the requested object is sent to the client 40.

If the comparison of the priority of the currently requested object with the priority of other objects in step 606 leads to the result that the currently requested object does not have the highest priority, the method continues with step 614. With respect to step 606 it should be noted that instead of comparing the priority of the currently requested object with the priorities of other objects it is also possible to compare the priority of the currently requested object with a fixed threshold or to add an offset in the comparison so that two priorities have to be different by more than a predefined threshold before the difference is considered significant enough.

In step 614 the proxy server 30 estimates if the link 14 to the client 40 (see FIG. 2) is or will be idle. As explained above, there are several ways to do that. One of them comprises calculating a running average of the maximum amount of data that was sent and acknowledged during the last N seconds over all connections 50 going to the same client 40. This gives an estimate of the maximum throughput available.

The result thus obtained is then compared with the amount of data that is ready to be sent on the connections 50 that are not suspended. If the proxy server 30 detects that it does not have enough data to send in order to fill the link during at least one complete round-trip time, then it considers that there is some spare bandwidth on the link 14 towards the client 40 and continues with step 616.

In step 616 a comparison similar to that of step 606 is performed. If it is determined in step 616 that the currently requested object has a higher priority than all objects expected soon, the proxy server 30 continues via node 610 with step 612 and sends the currently requested object immediately to the client 40. Otherwise the method continues with step 618 and a redirection message (status code "302") is sent to the client 40 as discussed above in conjunction with FIG. 4.

The decision taken in step 616 can be influenced by the size of the currently requested object (if it is already known). If the object is known to be small (e.g. less than twice the size of a redirection message), then the proxy server will always send the object instead of sending a redirection message, even if the object had been assigned a very low priority until then (this can be considered as one way of updating the priority).

If it is determined in step 614 that there is enough data to be sent in order to fill the link 14, the method continues with step 620 and suspends the connection 50 to the client 40 via which the currently requested object is to be transferred.

From either one of step 612, 618 and 620 the method continuous with step 622. In step 622 the proxy server 30 re-evaluates all suspended connections 50 to find out whether any one of the suspended connections 50 are to be opened again.

The HTTP/1.1 protocol supports the pipelining option, which allows the client 40 to send several requests to the server 20 or proxy server 30 on the same TCP connection without waiting for the previous replies. In the case pipelining is used, more than one object that is ready to be sent could be sent on the same connection 50 towards the client 40. It is apparent that in such a case an object having a low priority could block a second object having a high priority that is to be sent on the same connection 50. If there are several objects waiting on the same connection 50, the maximum or average priority of these objects may be determined and considered in steps 606 and 616. This ensures that objects of lower priority do not block objects of higher priority.

Possible Extensions

Several extensions, some of which have already briefly been discussed, to the exemplary embodiment described with reference to FIGS. 1 to 6 could be implemented.

One of these extension relates to constraining the transfer speed on link 14 in dependence of the priority of the objects to be transferred. This could be done for example by allocating a specific share of processing capabilities to each connection 50 depending on the priority of the objects to be transferred. The priority of the individual objects is decreased while the process is running. If the proxy server 30 processes connections 50 in a round-robin fashion, this feature can be implemented by limiting the amount of data transferred per round on each connection 50 by a number that is derived from the priority of that object. The dynamic allocation of processing capabilities can advantageously be combined with the suspension and redirection mechanisms discussed above. The processing capabilities can also include any transformation of the objects or codes being transferred.

According to a further extension of the invention, the priorities are assigned directly by the browser running on the client 40. The browser can then schedule the HTTP requests for individual objects according to their priority. If the priorities are assigned directly by the browser, there are some additional factors that can be used for refining the priority of each object:

position of the object in the page (coordinates)

relative position of the visible area (objects that are outside the visible area have a lower priority)

if image loading or script execution is disabled, the browser knows immediately that it is not necessary to assign a priority to these objects.

Additionally, the browser knows when a user selects a new HTML page from the bookmarks or by typing in a new URL. The browser can thus clear the list of objects that are no longer required.

A further extension of the invention relates to a proxy component that is located on the same computer (client) as the browser or close to this computer in terms of network links. This situation is depicted in FIG. 7.

Figure 7:
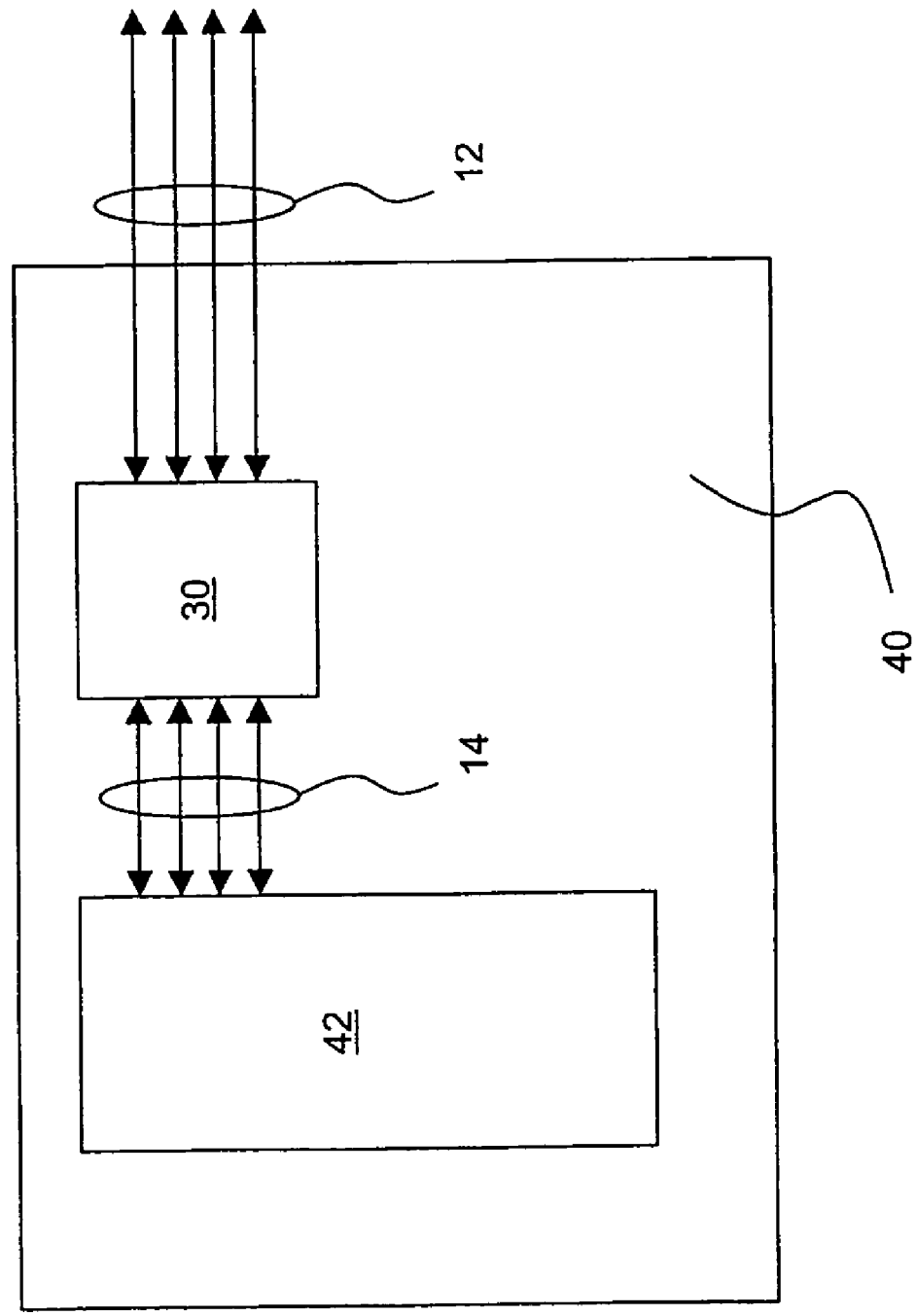
FIG. 7 is a block diagram depicting a proxy component according to the invention located on a network client.

As becomes apparent from FIG. 7, the client 40 not only comprises a browser component 42 but an additional proxy component 30 (having the structure shown in FIG. 3) in communication with the browser component 42. In such a case the link 14 between the proxy component 30 and the browser component 42 has a much higher capacity and lower latency than the link 12 between the proxy component and the server 20 (not depicted in FIG. 7).

As a result, the client-side proxy component 30 influences the request stream because it cannot do much on the response stream. Based on the priority information derived from the current HTTP request and previous HTTP responses (e.g. previous HTML codes referring to further objects) as well as an estimate of the link availability, the client-side proxy component 30 will decide if a HTTP request should be forwarded to the server and/or if it should reply immediately with a redirection message.

The decisions to be taken are simpler than depicted in the flow chart of FIG. 6. More particularly, the decisions can be reduced to evaluating if the currently requested object has a lower priority than some of the objects being transferred or expected to be transferred soon and if the link is already fully used. If both conditions are given, then a redirection message is sent to the browser component 42. In all other cases, the HTTP request is immediately forwarded to the server.

If HTTP pipelining is used on a specific connection and if some previous HTTP requests are being processed, then the client-side proxy component 30 can suspend the HTTP request until it can take the decision. It will have to take a decision at the latest when the previous objects have been fully received.

A still further extension of the invention relates to the blocking of downloads for some objects based on their priority. This means that the priority that is assigned to the objects can also be used to block the objects completely. If a threshold on the priority has been set, any object that has a priority that is lower than this threshold will not be sent to the client 40. In this case the proxy server (or proxy component) 30 would simply return one of the "4xx" or "5xx" status codes defined in the HTTP/1.1 standard to the client 40 when it detects such an object. Possible status codes are "403 forbidden", "409 conflict" or "503 service unavailable".

As an additional extension the priorities assigned to the objects could be used for pre-fetching. A pre-fetching mechanism allows the proxy server 30 to fill its buffer 36 (see FIG. 3) with some objects before the client 40 actually requests them. Such a pre-fetching mechanism may for example be based on the analysis of a HTML code that is sent from the proxy server 30 to the client 40 and that includes references to further objects. Based on the analysis of the references to the objects the proxy component 30 assigns priorities to the individual objects and on the basis of this assignment it is defined which objects are to be pre-fetched and in what order. Preferably, the objects are pre-fetched starting with the objects having the highest priority.

According to a still further extension that may be combined with the pre-fetching mechanism discussed above, specific pushing schemes are implemented that allow to transfer objects from the proxy server 30 to the client 40 without having received an explicit object request from the client 40.

Various modifications of the preferred embodiment are possible without departing from the scope and spirit of the present invention. Although the invention has been described in connection with a preferred embodiment, it is to be understood that this description is not intended to limit the invention thereto. Rather, the invention is intended to cover all modifications and/or additions to the above-mentioned description, without departing from the spirit and the scope of the invention.

The invention claimed is:

1. A method, in a communications network, of controlling an object transfer from a first component to a second component remote from the first component, wherein the object transfer is based on a plurality of object requests relating to objects referred to in one or more codes to be processed by the second or another component of the communications network, the method comprising steps of:

utilizing an intermediate component positioned between the first and the second component for:

sending an object request to the first component;

receiving the requested object from the first component;

estimating traffic over a link, comprising a number of connections, between the intermediate component and the second component to determine whether the link is fully used before suspending a connection to avoid wasting available bandwidth;

dynamically assigning a priority to the requested object, wherein an initial priority has been assigned to the requested object on the basis of an analysis of at least one of the object request and the code that refers to the requested object; and depending on the priority of the requested object, the intermediate component delaying the requested object when the requested object has a priority that is below a threshold priority and forwarding the requested object to the second component when the requested object has a priority that is above said threshold priority, wherein delaying of the requested object includes at least one of instructing the second component to repeat the object request, wherein instructing the second component to repeat the object request includes:

assigning a specific attribute to the object to be delayed;

informing the second component of the attribute;

receiving a reference to the attribute from the second component; and upon receipt of the reference to the attribute, sending the delayed object to the second component or further delaying the delayed object;

suspending a connection to the second component via which the requested object is to be forwarded, and informing the second component that the requested object will automatically be forwarded at a later point in time.

2. The method of claim 1, wherein the delaying is performed such that an order in which the objects are received from the first component differs from the order in which the objects are forwarded to the second component.

3. The method of claim 1, wherein the object request is received from the second component or generated by the intermediate component.

4. The method of claim 1, further comprising:

sending a code request to the first or a third component;

receiving the requested code from the first or the third component;

analyzing the received code with respect to references to objects;

assessing the references to objects with the purpose of assigning initial priorities to the objects referred to in the received code.

5. The method of claim 1, wherein upon receipt of a response containing the object requested from the first component, the response is evaluated with respect to a received object's priority in order to determine whether or not an initial priority of the received object has to be updated.

6. The method of claim 1, further comprising generating a priority list that contains priority information for individual objects or classes of objects.

7. The method of claim 6, further comprising repeatedly assessing the priority list with respect to at least one of updating priority information, deleting objects or classes of objects and corresponding information, from the priority list.

8. The method of claim 1, wherein the steps are performed by a proxy component situated on the first component, on the second component or configured as a separate hardware component of the communications network.

9. A method in a communications network, of controlling an object transfer from a first component to a second component remote from the first component, wherein the object transfer is based on a plurality of object requests relating to objects referred to in one or more codes to be processed by the second or another component of the communications network, the method comprising steps of:

utilizing an intermediate component positioned between the first and the second component for:

sending an object request to the first component;

receiving the requested object from the first component;

estimating traffic over a link, comprising a number of connections, between the intermediate component and the second component to determine whether the link is fully used before suspending a connection to avoid wasting available bandwidth;

dynamically assigning a priority to the requested object, wherein an initial priority has been assigned to the requested object on the basis of an analysis of at least one of the object request and the code that refers to the requested object; and depending on the priority of the requested object, the intermediate component delaying the requested object when the requested object has a priority that is below a threshold priority and forwarding, when the priority of the requested object is above the threshold priority, the requested object via the number of connections to the second component, based on comparing an average throughput of the number of connections to the second component to an amount of data that is currently cached or buffered in the intermediate component.

10. The method of claim 9, wherein selected ones of the number of connections to the second component are suspended dependent upon the priority of the requested object that is received from the first component and that is to be forwarded via the selected ones of the connections.

11. The method of claim 9, further including the step of dynamically allocating a specific share of processing capabilities to each of the number of connections.

12. The method of claim 9, further comprising:
sending a code request to the first or a third component;
receiving the requested code from the first or the third component;
analyzing the received code with respect to references to objects;
assessing the references to objects with the purpose of assigning initial priorities to the objects referred to in the received code.

13. The method of claim 9, wherein upon receipt of a response containing the object requested from the first component, the response is evaluated with respect to the received object's priority in order to determine whether or not the initial priority of the received object has to be updated.

14. The method of claim 9, further comprising generating a priority list that contains priority information for individual objects or classes of objects.

15. The method of claim 14, further comprising repeatedly assessing the priority list with respect to at least one of updating priority information, deleting objects or classes of objects and corresponding information, from the priority list.

16. The method of claim 9, wherein the steps are performed by a proxy component situated on the first component, on the second component or configured as a separate hardware component of the communications network.

17. The method of claim 9, wherein the delaying is performed such that an order in which the objects are received from the first component differs from the order in which the objects are forwarded to the second component.

18. The method of claim 9, wherein the object request is received from the second component or generated by the intermediate component.

19. The method of claim 9, wherein delaying of the requested object includes at least one of
instructing the second component to repeat the object request,
suspending a connection to the second component via which the requested object is to be forwarded, and
informing the second component that the requested object will automatically be forwarded at a later point in time.

20. The method of claim 19, wherein instructing the second component to repeat the object request includes:
assigning a specific attribute to the object to be delayed;
informing the second component of the attribute;
receiving a reference to the attribute from the second component; and
upon receipt of the reference to the attribute, sending the delayed object to the second component or further delaying the delayed object.

21. An apparatus in a communications network for controlling an object transfer from a first component to a second component which is remote from the first component, wherein the object transfer is based on a plurality of object requests relating to objects referred to in one or more codes to be processed by the second component of the communications network, the apparatus comprising:
an intermediate component between the first component and the second component;
a communications interface coupled with the intermediate component for sending an object request to the first component and for receiving the requested object from the first component:
means for estimating traffic on a link, comprising a number of connections, between the intermediate component and the second component for determining whether the link is fully used before suspending a connection in order to avoid wasting available bandwidth;
a processing unit for dynamically assigning a priority to the requested object, wherein an initial priority has been assigned to the requested object on the basis of an analysis of at least one of the object request and the code that refers to the requested object, and
wherein the processing unit depending on the priority of the requested object, delaying the requested object when the requested object has a priority that is below a threshold priority and controlling the communications interface to forward the requested object to the second component when the requested object has a priority that is above said threshold priority, wherein the requested object is forwarded via the number of connections based on comparing the average throughput of the number of connections to the second component to an amount of data that is currently cached or buffered in the intermediate component.

* * * * *

UNITED STATES PATENT AND TRADEMARK OFFICE
CERTIFICATE OF CORRECTION

| | |
|---|---|
| PATENT NO. | : 7,721,294 B2 |
| APPLICATION NO. | : 10/509979 |
| DATED | : May 18, 2010 |
| INVENTOR(S) | : Quinet et al. |

Page 1 of 1

It is certified that error appears in the above-identified patent and that said Letters Patent is hereby corrected as shown below:

In Column 13, Line 18, delete "HTM" and insert -- HTTP --, therefor.

In Column 14, Line 40, delete "In" and insert -- in --, therefor.

Signed and Sealed this

Twelfth Day of October, 2010

David J. Kappos
*Director of the United States Patent and Trademark Office*